US008286090B2

(12) United States Patent
Ballard et al.

(10) Patent No.: US 8,286,090 B2
(45) Date of Patent: Oct. 9, 2012

(54) SYSTEMS AND METHODS FOR DISPLAYING AND VISUALIZING INFORMATION

(75) Inventors: Terry Gene Ballard, Kaysville, UT (US); Thomas David Burton, Salt Lake City, UT (US); William Murray Stoval, Draper, UT (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 11/876,101

(22) Filed: Oct. 22, 2007

(65) Prior Publication Data
US 2009/0106691 A1    Apr. 23, 2009

(51) Int. Cl.
*G06F 3/048* (2006.01)

(52) U.S. Cl. ......... 715/781; 715/797; 715/800; 715/801

(58) Field of Classification Search ................ 715/781, 715/800–801, 797
See application file for complete search history.

(56) References Cited

U.S. PATENT DOCUMENTS

| | | | | |
|---|---|---|---|---|
| 5,812,983 A * | 9/1998 | Kumagai | ............................ | 705/3 |
| 6,052,155 A * | 4/2000 | Cherrick et al. | .............. | 348/565 |
| 6,081,809 A * | 6/2000 | Kumagai | ............................... | 1/1 |
| 6,300,947 B1 * | 10/2001 | Kanevsky | ...................... | 715/866 |
| 6,621,918 B1 * | 9/2003 | Hu et al. | ........................ | 382/128 |
| 6,734,880 B2 * | 5/2004 | Chang et al. | ................... | 715/738 |
| 6,954,700 B2 * | 10/2005 | Higashida et al. | ............... | 702/19 |
| 7,177,948 B1 * | 2/2007 | Kraft et al. | ..................... | 709/246 |
| 7,237,205 B2 * | 6/2007 | Sarel | .............................. | 715/786 |
| 7,346,856 B2 * | 3/2008 | Nguyen et al. | ................. | 715/800 |
| 7,395,500 B2 * | 7/2008 | Whittle et al. | .................. | 715/243 |
| 7,451,405 B2 * | 11/2008 | Sylthe et al. | ................... | 715/800 |
| 7,671,868 B2 * | 3/2010 | Morita et al. | .................. | 345/581 |
| 7,949,954 B1 * | 5/2011 | Jezek, Jr. | ....................... | 715/800 |
| 2002/0005818 A1 * | 1/2002 | Bruzzone | .......................... | 345/6 |
| 2002/0116226 A1 * | 8/2002 | Auer et al. | ......................... | 705/3 |
| 2003/0016248 A1 * | 1/2003 | Hayes Ubillos | .............. | 345/800 |
| 2004/0008219 A1 * | 1/2004 | Sarel | .............................. | 345/700 |
| 2006/0136825 A1 * | 6/2006 | Cory et al. | ...................... | 715/700 |
| 2006/0150118 A1 * | 7/2006 | Chaudhri et al. | .............. | 715/800 |
| 2006/0206013 A1 * | 9/2006 | Rothman et al. | ............... | 600/300 |
| 2006/0248471 A1 * | 11/2006 | Lindsay et al. | ................ | 715/800 |
| 2007/0038475 A1 * | 2/2007 | Schlessinger et al. | ............ | 705/2 |
| 2007/0250789 A1 * | 10/2007 | Bell et al. | ....................... | 715/800 |
| 2008/0126982 A1 * | 5/2008 | Sadikali et al. | ............... | 715/810 |
| 2008/0168388 A1 * | 7/2008 | Decker | .......................... | 715/800 |
| 2008/0243548 A1 * | 10/2008 | Cafer | ................................. | 705/3 |
| 2010/0210953 A1 * | 8/2010 | Sholder et al. | ................ | 600/484 |
| 2011/0125527 A1 * | 5/2011 | Nair | ................................. | 705/3 |

OTHER PUBLICATIONS

David W. Forslund, PhD, Richard L. Phillips, PhD, David G. Kilman, MS, James L. Cook, MD, Experiences with a Distributed Virtual Patient Record System, 1996, AMIA, Inc. pp. 483-487.* Tara Matthews, Mary Czerwinski, George Roberston, Deseny Tan, Clipping Lists and Change Borders: Improving Multitasking Efficiency with Peripherial Information Design, CHI 2006 Proceedings, Apr. 26, 2006, pp. 989-998.*

* cited by examiner

*Primary Examiner* — Mark Rinehart
*Assistant Examiner* — Meseker Takele
(74) *Attorney, Agent, or Firm* — Hanley, Flight & Zimmerman, LLC

(57) ABSTRACT

Certain embodiments of the present technology provide a method of displaying and visualizing information in accordance with the amount of screen space available. Other embodiments provide a system for displaying and visualizing information in accordance with the amount of screen space available. Yet other embodiments provide a computer-readable medium having a set of instructions for execution by a computer, the set of instruction capable of displaying and visualizing information in accordance with the amount of screen space available.

17 Claims, 3 Drawing Sheets

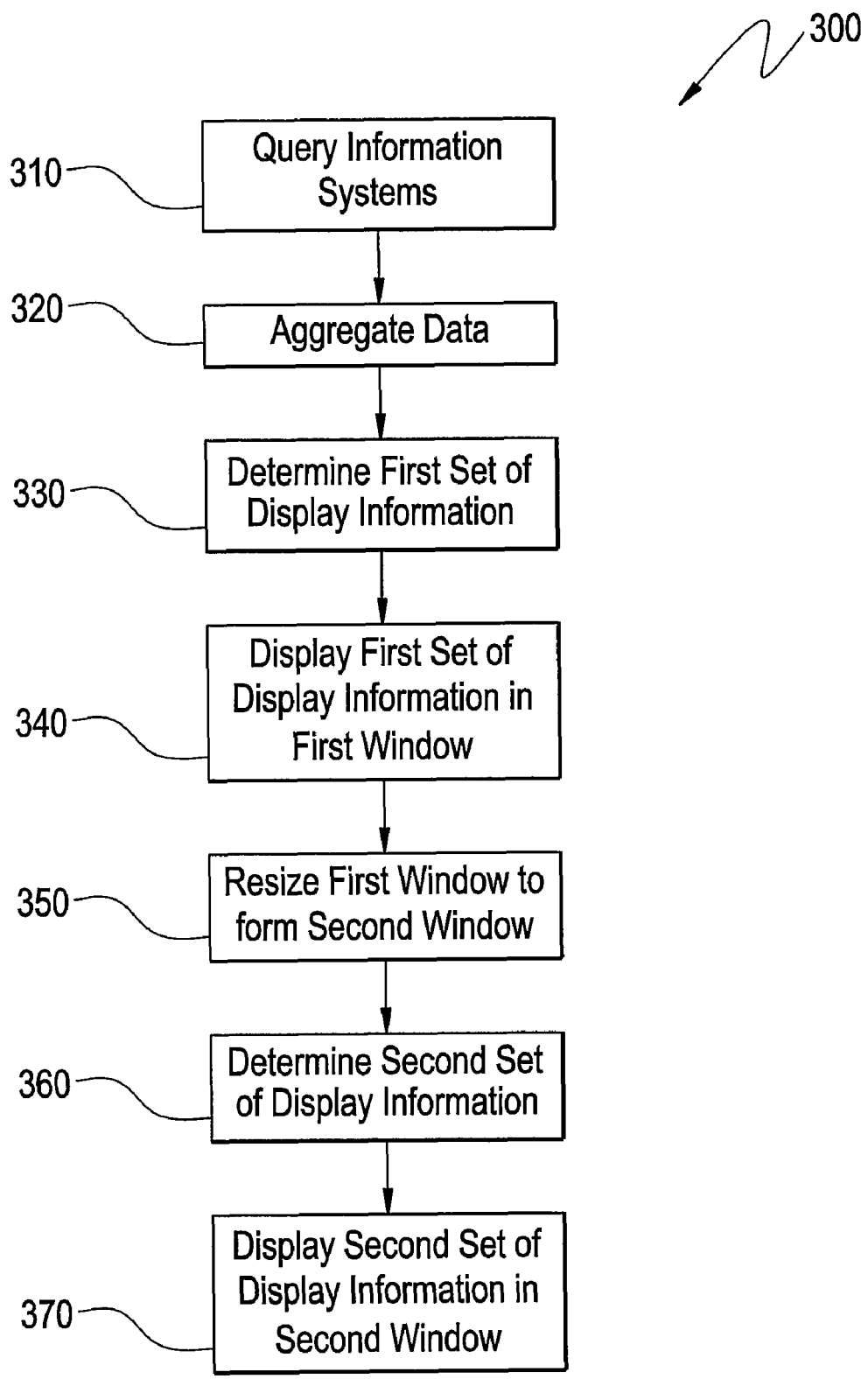

SYSTEMS AND METHODS FOR DISPLAYING AND VISUALIZING INFORMATION

BACKGROUND OF THE INVENTION

Generally, the technical field involves information systems that display and visualize information in accordance with the amount of screen space available. Specifically, it involves healthcare information systems for displaying and visualizing patient data according to the amount of screen space available.

Information systems are used in a number of industries to provide a display and/or visualization of a variety of data points. Often, the data comes from numerous applications. It is convenient for the user to simultaneously have access to each of these multiple applications.

For example, healthcare information systems currently provide the display and visualization of a variety of patient information, including vital signs, laboratory results, measurements, etc. Physicians, nurses and hospital personnel often need access to a variety of different data sources during patient care. It is important that the caregivers have quick access to a variety of information sources because some conditions require immediate attention, creating dangerous time constraints.

Current information systems display information using a multiple document interface (MDI). This interface allows the user to access multiple documents. MDI is a programming interface for creating an application that enables users to work with multiple documents at the same time. Each document is in a separate space with its own controls for scrolling. The user can see and work with different documents such as a spreadsheet, a text document, or a drawing space by simply moving the cursor from one space to another.

However, this interface displays information in a static form. This means the information remains constant even though the size or shape of the display may change. If a user wants to view information in a minimized document, he or she must open or expand the minimized document in order to attain the useful information. For example, when a window is minimized to 50% of its original size, the data in the window remains its original size. This means portions of the data are no longer visible. The user must either expand the document or scroll through the minimized window. This causes the user to lose access to useful information.

BRIEF SUMMARY OF THE INVENTION

Certain embodiments of the present technology provide systems and methods for displaying and visualizing information in accordance with the amount of screen space available. Specifically, it involves systems and methods for displaying and visualizing patient data in a healthcare environment according to the amount of screen space available.

Certain embodiments of the present method of displaying and visualizing information in accordance with the amount of screen space available comprise determining a first set of display information based on a set of data points and a size of a first window; displaying the first set of display information in the first window using a first graphical representation; resizing the first window to form a second window of a different size than the first window; determining a second set of display information based on the set of data points and the size of the second window; and displaying a second graphical representation within the second window such that the second graphical representation depicts the second set of display information. These steps can be performed sequentially or in another order. In one embodiment of the present method the set of data points relate to patient information.

Certain embodiments of the present system for displaying and visualizing information in accordance with the amount of screen space available comprise a database containing data points; a wordlist wherein the wordlist determines various sets of display information corresponding to a set of data points and wherein the various sets of display information correspond to various amounts of screen space available; a scalable user interface wherein, prior to resizing a first window, the interface uses a first graphical representation to represent a first set of display information corresponding to an amount of screen space available in the first window and after resizing a second window uses a second graphical representation to depict a second set of display information corresponding to an amount of screen space available in the second window. In one embodiment the set of data points relate to patient information.

Another embodiment of the present technology is a computer-readable medium having a set of instructions for execution by a computer, the set of instruction comprising a determination routine configured to determine sets of display information based on a set of data points and various amounts of screen space available; a display routine configured to display a first set of display information in a first window using a first graphical representation wherein the first set of display information corresponds to an amount of screen space available in the first window; a resizing routine configured to resize the first window to form a second window of a different size than the first window; a second display routine configured to display a second graphical representation within the second window such that the second graphical representation depicts a second set of display information and wherein the second set of display information corresponds to an amount of screen space available in the second window. In one embodiment of the computer-readable medium the data points relate to patient information.

These and other features of the present invention are discussed or apparent in the following detailed description.

BRIEF DESCRIPTION OF SEVERAL VIEWS OF THE DRAWINGS

FIG. 3 illustrates a flow diagram for a method for displaying and visualizing information in accordance with the amount of screen space available according to an embodiment of the present technology.

Figure 1:
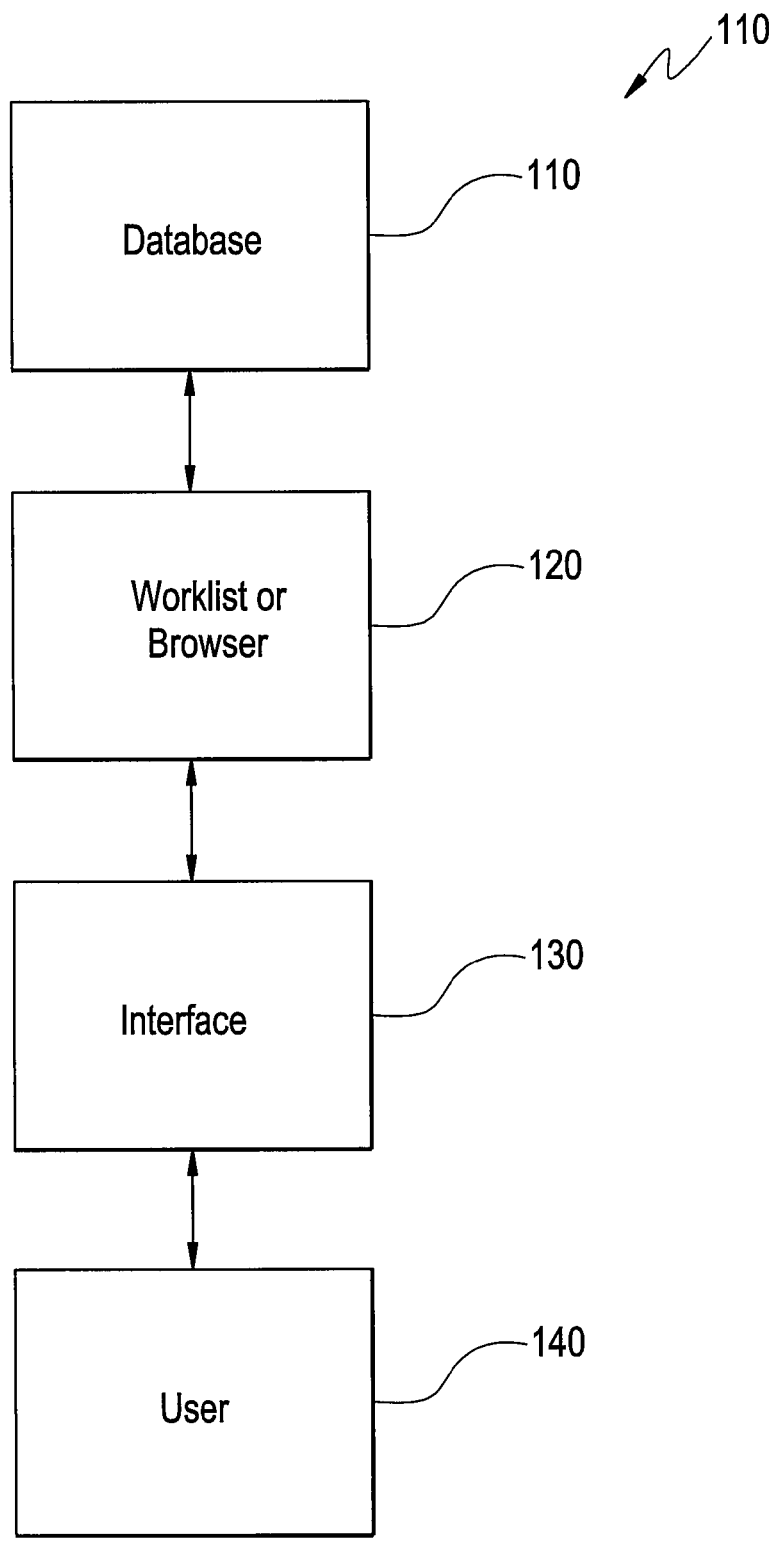
FIG. 1 illustrates a system for displaying and visualizing information in accordance with the amount of screen space available according to an embodiment of the present technology.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

The current technology relates to systems and methods for displaying and visualizing information in accordance with the amount of screen space available. Specifically, it involves systems and methods for displaying and visualizing patient data in a healthcare environment according to the amount of screen space available. Although certain particulars of a healthcare information system are used as examples, the current technology should not be viewed as limited to such systems.

The current system and method use a scalable user interface. As the window size increases or decreases, the visual representation of the data changes correspondingly. This change ensures that the visual representation still conveys its intended meaning. For example, if the user is looking at a list of data and the window size is decreased, the visual representation may change to a chart, graph or other visual representation in order to still convey the relevant information using the smaller amount of screen space. In this manner the information presented is not limited.

FIG. 1 illustrates a system (100) for displaying and visualizing information in accordance with the amount of screen space available according to an embodiment of the present technology. In one embodiment, the present system (100) comprises a database (110); a wordlist or browser (120); a scalable user interface (130); and a user (140). The database (100) is in communication with the wordlist or browser (120). The wordlist or browser (120) is in communication with the scalable user interface (130). The scalable user interface (130) is in communication with the user (140).

The components of the system (100) may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain components may be integrated in various forms and/or may be provided as software and/or other functionality on a computing device, such as a computer. Certain embodiments may omit one or more of the components of the system (100).

The current system (100) has a database (110) containing a number of data points. In one embodiment, these data points relate to patient data. The data points can be classified into sets of data points.

A wordlist or browser (120) is used to create sets of display information. Each set of display information corresponds to a particular set of data points. Each set of display information also corresponds to a certain amount of screen space available. This means that a set of data points has multiple sets of display information associated with it. For a given set of data points, there will be one set of display information for each size of screen space available.

The display information contains different levels of information depending on the amount of screen space available. Where more screen space is available, the display information includes more information from the set of data points. In one embodiment, the display information may include the complete set of data points. Where less screen space is available, the display information is selectively chosen to convey meaningful, relevant and pertinent information in the reduced space. For example, the display information in a small window could be in the form of selected key data points, a summary of key data points, a summary of all data points in the set, an abbreviation of data points, or an indicator to consult a larger window for more information about the data points.

The set of display information may be user specific. This means the display information for a set of data points, for a certain amount of screen space may be different depending on who is using the system (100). For example, when a hospital administrator is using the system (100), the display information for a certain size of screen space may only contain high level administrative information. When a caregiver is using the system, the display information for a certain size of screen space may only contain clinically sensitive pieces of data.

The set of display information may also be context specific. This means the display information for a set of data points, for a certain amount of screen space may be different depending on the situation where the system (100) is being used. For example, if a certain patient visited the hospital for knee surgery (100), the display information for a certain size of screen space may only contain different information than the display information for the same size of screen space when he/she returns for physical therapy.

A scalable user interface (130) displays the set of data points. The scalable user interface (130) has a first window. This first window has a certain size. There is a set of display information corresponding to the size of the first window for any given set of data points. The display information is displayed in the first window using a first graphical representation. The first graphical representation can take a number of forms. For example, the first graphical representation can be a list, chart, pie chart, graph, linear graph, bar graph, excerpt of text, illustration, flow diagram, picture, drawing, etc.

The user (140) can then use the scalable user interface (130) to resize the first window. The user could resize the window using an input device, such as a keyboard, a touchscreen, a joystick, a mouse, a touchpad, and/or a microphone.

The resizing creates a second window of a different size than the first window. The second window can be smaller or larger than the first window. There is a set of display information corresponding to the size of the second window for the set of data points. The display information corresponding to the size of the second window is displayed in the second window using a second graphical representation. The second graphical representation can take a number of forms. For example, the second graphical representation can be a list, chart, pie chart, graph, linear graph, bar graph, excerpt of text, illustration, flow diagram, picture, drawing, etc. The second graphical representation is not a scaled version of the first graphical representation. The second graphical representation is also not simply a portion of the first graphical representation that fits into the second window.

The current system (100) displays and visualizes information in accordance with the screen space available by using different sets of display information and different graphical representations depending on the amount of space available. This allows the user to maintain useful, meaningful information in a resized window.

As mentioned above the display information can be user and/or context specific. The first and second graphical representations could also be different between users or situations in that embodiment.

In another embodiment, the first window can be reduced to a window header. Typically, window headers were a small icon that merely shows the name of the document. Due to the limited space in a window header, the set of display information will be limited but can be more informative than merely the name of the document. For example, the display information could be an informative header, a symbol, an abbreviation, an indicative color or an indicator to consult a larger window for more information about the data points. This display information may then be displayed in the window header. For example, a window regarding a patient's allergies could be reduced to a window header that states "No Known Allergies" or has a red warning with an abbreviation for a certain allergy.

Figure 2:
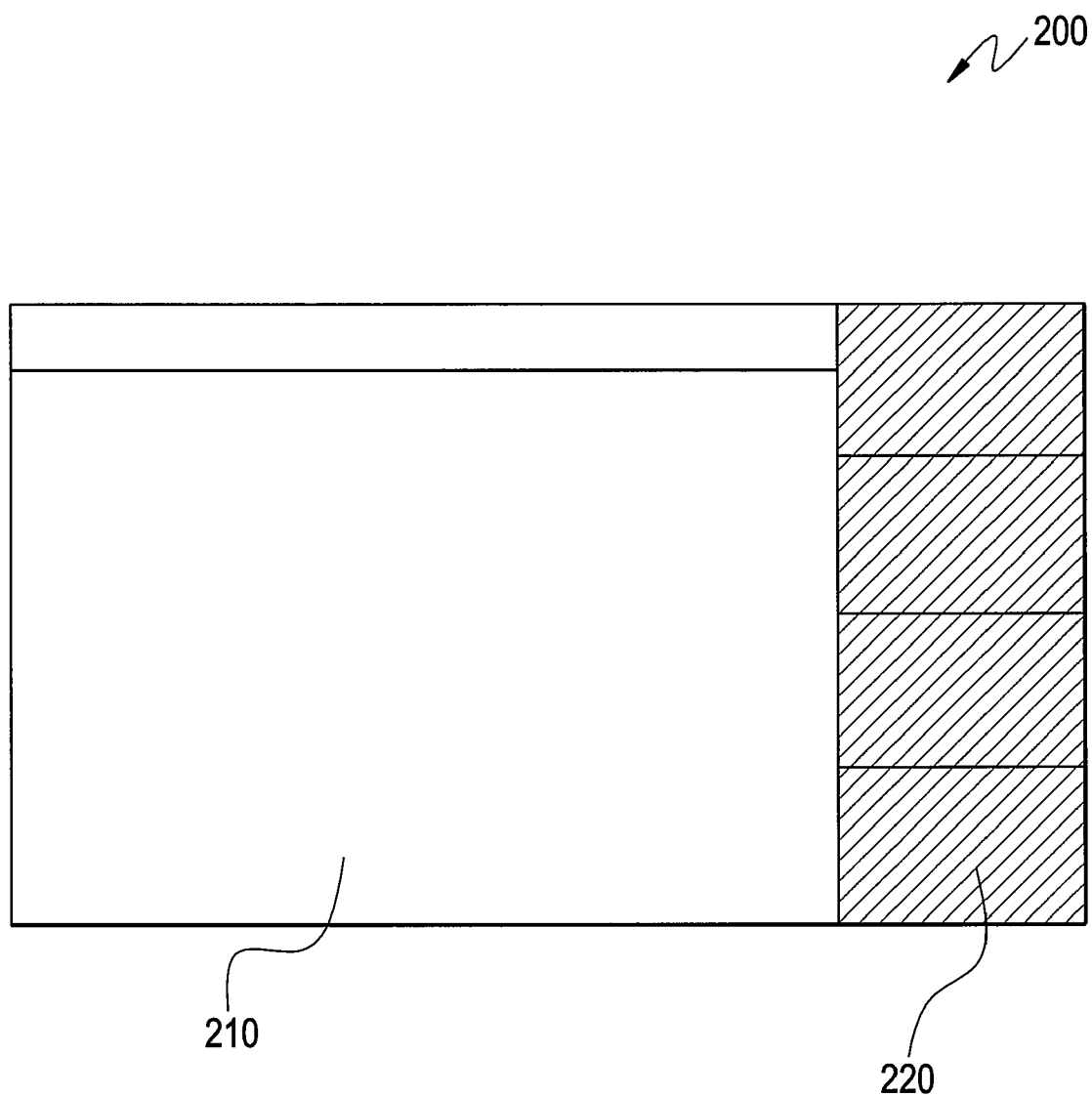
FIG. 2 illustrates a screen shot of a system that displays and visualizes information in accordance with the amount of screen space available according to an embodiment of the present technology.

FIG. 2 illustrates a screen shot (200) of a system that displays and visualizes information in accordance with the amount of screen space available according to an embodiment of the present technology. The screen shot shows an originally sized first window (210) and a resized second window (220). This example shows the original window as the larger window and the resized window as the smaller window. However, these roles could also be reversed so that the original window is the smaller window and the resized window is the larger window. In this example the resized second window (220) displays summary information, as determined by the set of display information for that size of screen space available. The original first window (210) shows a larger amount of information related to the set of data points based on the larger amount of space available and the larger amount of display information associated with that amount of space.

FIG. 3 illustrates a method (300) of displaying and visualizing information in accordance with the amount of screen space available according to one embodiment of the present technology. The method (300) involves querying an information system having a number of data points (310); aggregating a set of data points (320); determining a first set of display information based on the set of data points and the size of a first window (330); displaying the first set of display information in a first window using a first graphical representation (340); resizing the first window to form a second window (350); determining a second set of display information based on the set of data points and the size of the second window (360); and changing the first graphical representation into a second graphical representation within the second window such that the second graphical representation depicts the second set of display information (370).

In the first step, the information system is queried (310). The information system may take the form of a database, such as (110) discussed above. The information system may be a database, disparate databases or some other means of data storage. The information system contains or stores information or data points. The data points may pertain to a full department, a portion of a department or a number of departments within the relevant facility. In a healthcare facility, exemplary departments include radiology, cardiology, pharmacy, medication, oncology, pediatrics, physical therapy and lab information. Examples of data points stored in these databases could include patient vital information, medications, test results and medical history.

Querying the information system makes it possible to move on to the next step, aggregating the data points (320). Aggregating the data points from disparate databases allows healthcare professionals to compile the data points for a certain patient making all of that patient's information readily available. The information systems can be queried and then aggregated using either a "push" or "pull" model, depending on the user's needs.

The next step involves determining a first set of display information based on a certain set of data points (330). The first set of display information corresponds to the set of data points. The first set of display information also corresponds to the amount of screen space available in a first window. The first set of display information may be determined using a wordlist or browser, such as (120) discussed above.

The first set of display information contains different levels of information depending on the amount of screen space available in the first window. Where more screen space is available, the first set of display information includes more information from the set of data points. In one embodiment, the first set of display information may include the complete set of data points. Where less screen space is available, the display information is selectively chosen to convey meaningful, relevant and pertinent information in the reduced space. For example, the first set of display information in a small window could be in the form of selected key data points, a summary of key data points, a summary of all data points in the set, an abbreviation of data points, or an indicator to consult a larger window for more information about the data points.

As discussed above, the first set of display information may be user specific. This means the display information for a set of data points for a certain amount of screen space may be different depending on who is using it. For example, a different first set of display information may be available to a hospital administrator than a caregiver.

As discussed above, the first set of display information may also be context specific. This means the display information for a set of data points for a certain amount of screen space may be different depending on the situation where it is used. For example, a different first set of display information may be available during surgery and during physical therapy for a certain patient.

In the next step, the first set of display information is displayed in the first window using a first graphical representation (340). This can be done using a scalable user interface, such as (130) discussed above. The first graphical representation can take a number of forms. For example, the first graphical representation can be a list, chart, pie chart, graph, linear graph, bar graph, excerpt of text, illustration, flow diagram, picture, drawing, etc.

In the next step, the first window is resized to form a second window (350). This can also be done using a scalable user interface, such as (130) discussed above. The user could resize the window using an input device, such as a keyboard, a touchscreen, a joystick, a mouse, a touchpad, and/or a microphone. The resizing creates a second window of a different size than the first window. The second window can be smaller or larger than the first window.

The next step involves determining a second set of display information based on the same set of data points (360). The second set of display information corresponds to the same set of data points as the first. The second set of display information also corresponds to the amount of screen space available in a second window. The second set of display information may be determined using a wordlist or browser, such as (120) discussed above.

As with the first set, the second set of display information contains different levels of information depending on the amount of screen space available in the first window. Where more screen space is available, the second set of display information includes more information from the set of data points. In one embodiment, the second set of display information may include the complete set of data points. Where less screen space is available, the display information is selectively chosen to convey meaningful, relevant and pertinent information in the reduced space. For example, the second set of display information in a small window could be in the form of selected key data points, a summary of key data points, a summary of all data points in the set, an abbreviation of data points, or an indicator to consult a larger window for more information about the data points.

As with the first set, the second set of display information may be user specific. This means the display information for a set of data points for a certain amount of screen space may be different depending on who is using it.

As with the first set, the second set of display information may also be context specific. This means the display information for a set of data points for a certain amount of screen space may be different depending on the situation where it is used.

In the next step, the first graphical representation is changed into a second graphical representation within the second window such that the second graphical representation depicts the second set of display information (370). This can be done using a scalable user interface, such as (130) discussed above. The second graphical representation can take a number of forms. For example, the second graphical representation can be a list, chart, pie chart, graph, linear graph, bar graph, excerpt of text, illustration, flow diagram, picture, drawing, etc. The second graphical representation is not a scaled version of the first graphical representation. The second graphical representation is also not simply a portion of the first graphical representation that fits into the second window.

The current method (300) displays and visualizes information in accordance with the screen space available by using different sets of display information and different graphical representations depending on the amount of space available. This allows the user to maintain useful, meaningful information in a resized window.

As mentioned above the sets of display information can be user and/or context specific. The first and second graphical representations can also be different from user to user or situation to situation in that particular embodiment.

In one embodiment of the present method (300), the first window can be reduced to a window header. The set of display information for the window header can be an informative header, a symbol, an abbreviation, an indicative color or an indicator to consult a larger window for more information about the data points. This display information may then be displayed in the window header.

One or more of the steps of the method (300) may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments may be implemented in one or more of the systems described above. For example, certain embodiments of the method (300) may be implemented using one or more local EMR (electronic medical record) systems, a database or other data storage storing electronic data, and one or more user interfaces facilitating capturing, integrating and/or analyzing information inputted by the patient.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

In one example, a clinical user may be viewing a chart with a bulleted list of the patient's current medications. When he or she resizes the window to 50% of its original size, the display could change to a pie chart or a bar graph. In this way the information could continue to be meaningful and informative to the user despite the limited space. The user would not merely see a smaller version or portion of the original chart and bulleted list.

In another example, a clinical user may be viewing an allergy window that lists all of a patient's allergies. When the user minimizes the allergy window it could become a window header with an informative summary. The informative summary could say "No Known Allergies" or use colors and abbreviations to indicate the allergies listed inside. This could allow the user to obtain valuable information without enlarging the allergy window.

In yet another example, the display information is user specific. The original window may contain a chart and a bulleted list. When an administrator resizes the window, it could become a chart containing high level administrative information, such as a broad overview of treatment and caregivers. When a caregiver resizes the window, it could reduce down to show only clinically sensitive pieces of data, such as specific medications or test results.

Thus, certain embodiments provide the technical effect of displaying and visualizing data according to the amount of screen space available. Certain embodiments also achieve the technical effect of providing relevant, meaningful information in a resized window.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

The invention claimed is:

1. A method of displaying and visualizing information in accordance with an amount of screen space available, the method comprising:
   determining a first set of non-image display information based on a set of data points and a size of a first window, wherein the set of data points relates to patient information;
   displaying the first set of non-image display information in the first window using a first graphical representation of a first form;
   automatically resizing the first window to form a second window of a different size than the first window, both the first and second windows scalable to display together via a graphical display based on an amount of available display space;
   determining a second set of non-image display information based on the set of data points and the size of the second window, wherein said second set of non-image display information is different from the first set of non-image display information and is selectively chosen to convey information in the resized second window; and
   displaying a second graphical representation within the second window such that the second graphical representation depicts the second set of non-image display information, wherein the second graphical representation is a second form of graphical representation from the first graphical representation and is not a portion of the first graphical representation or a resized copy of the first graphical representation.

2. The method of claim 1 wherein the elements of the method are performed sequentially.

3. The method of claim 1 wherein the first and second sets of display information are user specific.

4. The method of claim 1 wherein the second window is a window header.

5. The method of claim 4 wherein the second set of display information contains information other than the document title.

6. The method of claim 1 wherein the first and second sets of display information are context specific.

7. The method of claim 1 wherein the first form of the first graphical representation is selected from a list, chart, pie chart, graph, linear graph, bar graph, excerpt of text, illustration, flow diagram, picture, drawing and window header.

8. The method of claim 7 wherein the second form of the second graphical representation is selected from a list, chart, pie chart, graph, linear graph, bar graph, excerpt of text, illustration, flow diagram, picture, drawing and window header.

9. The method of claim 8 wherein the first form of the first graphical representation and the second form of the second graphical representation are not the same.

10. A system for displaying and visualizing information in accordance with an amount of screen space available, the system comprising:

a processor configured to allow communication between a database, a worklist and a scalable user interface;

the database containing data points, wherein the data points relate to patient information;

the worklist, wherein the worklist determines various sets of non-image display information corresponding to a set of data points and wherein the various sets of non-image display information correspond to various amounts of screen space available;

the scalable user interface wherein, prior to resizing a first window, the interface uses a first graphical representation of a first form to represent a first set of non-image display information corresponding to an amount of screen space available in the first window and after resizing a second window uses a second graphical representation to depict a second set of non-image display information corresponding to an amount of screen space available in the second window, wherein said second set of non-image display information is different from the first set of non-image display information and is selectively chosen to convey information in the resized second window, wherein the second graphical representation is a second form of graphical representation different from the first graphical representation and is not a portion of the first graphical representation or a resized copy of the first graphical representation, and wherein the first and second windows are automatically scalable to be displayed together based on the amount of screen space available.

11. The system of claim 10 wherein the sets of display information are user specific.

12. The system of claim 10 wherein the second resized window is a window header.

13. The system of claim 10 wherein the first and second sets of display information are context specific.

14. A non-transitory computer-readable medium having a set of instructions for execution by a computer, the set of instruction comprising:

a determination routine configured to determine sets of non-image display information based on a set of data points and various amounts of screen space available, wherein the set of data points relates to patient information;

a display routine configured to display a first set of non-image display information in a first window using a first graphical representation of a first form wherein the first set of display information corresponds to an amount of screen space available in the first window;

a resizing routine configured to resize the first window to form a second window of a different size than the first window;

a second display routine configured to display a second graphical representation within the second window such that the second graphical representation depicts a second set of non-image display information, wherein the second set of display information corresponds to an amount of screen space available in the second window and said second set of non-image display information is different from the first set of non-image display information and is selectively chosen to convey information in the resized second window, wherein the second graphical representation is a second form of graphical representation different from the first graphical representation and is not a portion of the graphical representation or a resized copy of the first graphical representation, and wherein the first and second windows are automatically scalable to be displayed together based on the amount of screen space available.

15. The system of claim 10 wherein the first form of the first graphical representation is selected from a list, chart, pie chart, graph, linear graph, bar graph, excerpt of text, illustration, flow diagram, picture, drawing and window header.

16. The system of claim 15 wherein the second form of the second graphical representation is selected from a list, chart, pie chart, graph, linear graph, bar graph, excerpt of text, illustration, flow diagram, picture, drawing and window header.

17. The system of claim 16 wherein the first form of the first graphical representation and the second form of the second graphical representation are not the same.

* * * * *